(No Model.)
W. F. MODES.
REGENERATING FURNACE.
No. 306,089. Patented Oct. 7, 1884.
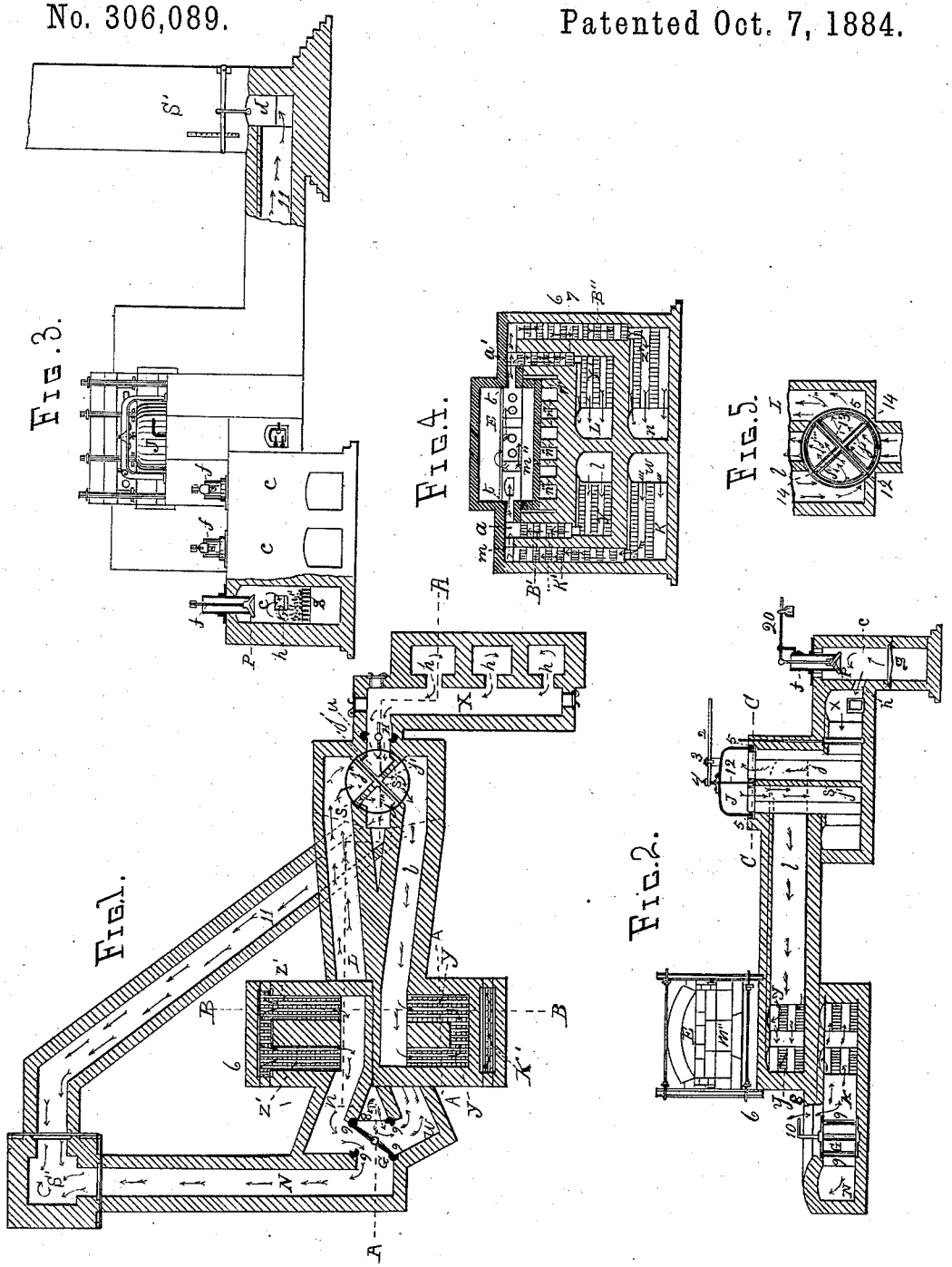
WITNESSES:
INVENTOR
William F. Modes
BY J. L. Chapin
ATTORNEY

UNITED STATES PATENT OFFICE.

WILLIAM F. MODES, OF STREATOR, ILLINOIS.

REGENERATING-FURNACE.

SPECIFICATION forming part of Letters Patent No. 306,089, dated October 7, 1884.

Application filed May 14, 1884. (No model.)

*To all whom it may concern:*

Be it known that I, WILLIAM F. MODES, of Streator, in the county of La Salle and State of Illinois, have invented new and useful Improvements in Regenerating-Furnaces, of which the following is a specification, reference being had to the accompanying drawings, in which—

Figure 1 is a sectional plan view of a regenerating-furnace embodying my improvements; Fig. 2, a sectional elevation thereof on line A; Fig. 3, a front elevation; Fig. 4, a sectional elevation on line B, Fig. 1; Fig. 5, a section on line C, Fig. 2.

The present invention relates to an improved furnace for generating heat for general purposes; but it is especially designed to be used for the manufacture of glass and smelting or reducing metals. In brief, the peculiar elements thereof consist in the novel construction of the furnace, which is formed to generate gas, and from which the gas is conveyed to a regenerator, wherein it is brought in contact with superheated atmospheric air, and charged therewith in such quantity as to produce intense heat at a comparatively small amount of fuel used in the gas-generator; and, further, in the novel construction and arrangement of mechanism to attain this end.

$c\ c\ c$ represent three furnaces for generating gas, consisting of grates $g$, feed-pipe $f$, the latter being provided with weighted valve P to prevent the escape of gas, and the furnaces provided with ports $h$, leading into the gas-chamber X, in which is placed a valve, H, to control the movement (as hereinafter described) of the gas.

Placed between the chamber X and flues L $l$ is a two-way valve, J, operating on top of a four-compartment well, $j\ j'\ j''\ j'''$ S. The two-way valve is hung over the well by means of lever 2, fulcrum 3, and pivot 4, and is fitted to the top of the well by water-seat 5, Figs. 2, 3, and 5. The valve J may be raised by lever 2, and then turned for reversing the direction of the generated gas, respectively, into either of the passages L $l$. These passages L $l$ lead into a regenerator, 6, which is constructed at the outer sides of these passages of open brick-work $y\ y'$, which form, in conjunction with open brick-work B″ 7 at the outer ends and above the brick-work $y\ y'$, passages for smoke or gas to reach the chamber E.

In the horizontal section of the regenerating-chamber at Fig. 1 the part Z′ is cut through the part Z′, Fig. 4. The part $y$, Fig. 1, is cut through $y$, Fig. 4. Air is admitted through a port, 8, Figs. 1 and 2, and by means of a valve, G 10, having four seats, 9, it may be admitted into either of the flues $w\ n$, from whence it may pass from said flues to chamber E by means of passage K K′, leading from the flue $w$, or by passages Z′ B″ on the other side of the generator to chamber E, where it, in conjunction with the gas, produces an intense heat, the smelting-chamber being shown at $m''$.

S′ represents the stack, to the lower end of which is hung a damper, $d$, to regulate the escape of products of combustion from the regenerator. Flue 11 leads from the well S J $j'$, &c., to the stack S′, and the pipe N leads from the valve G 10 to the stack. The material used in construction is such as is ordinarily employed in furnaces for generating intense heat—for instance, fire-clay or fire-brick for the hotter parts, iron for the more delicate parts, and brick or stone for the foundation and case.

The operation is as follows: Bituminous coal is put into the gas-generators $c\ c\ c$ through the feed-pipes $f$, and the combustion takes place on the grate-bars $g$, as shown at Figs. 2 and 3. The gases arising from the combustion of this coal rise and pass through openings $h$ into the gas-chamber X, from thence through valve H into the part $j$ of the gas-well, then up and over the bridge-wall S, and down into part $j'$, as shown at Figs. 1 and 2, thence into the flue $l$ to the regenerator 6, and passes into the heated checker-brick-work $y\ y$, and up to the point $a$, (through brick-work B′,) where it comes in contact with a current of superheated air, and at this point combustion takes place. The air is conducted to this point $a$ as follows: Air is admitted through opening 8 into the flue $w$, (the valve G being in the position shown at Fig. 1;) from thence it passes into the heated brick-work K K′, and from thence up through the vertical flue K′, (also of open brick-work,) and through passage $m$ to the point $a$, where it meets the superheated gas, and combustion takes place, as before stated. The cap-brick $t$ over passage $m$ is set at an angle to deflect the flame of combustion into the center of the chamber E and onto the glass or other material in the receptacle $m''$ which is to be melted thereby. From the chamber E the flame passes out through passage $a'$ on the opposite side, and a part thereof passes down the flue 7 into and through brick-work $y'$, and from thence into flue L, through the same and into the part $j''$ of the gas-well, from thence up to and over the top of the bridge-wall S, down through the part $j'''$, and from thence into flue 11, through the same, and out through the stack S'; also, a part of the flame passes from the passage $a'$ down through the checker brick-work B'' and Z' into and through flue $n$, and through flue N to the stack S'. This arrangement of the checker brick chambers is of considerable advantage, in that the heat of the returning products of combustion is retained close to the melting-chamber, and less space and number of conducting-passages are required than in the ordinary regenerators now in use.

The method of operating and changing the gas and air currents, which is done about every thirty minutes, is as follows: The valve H is closed to shut off the gas from chamber X. The air-valve G is reversed from the position shown at Fig. 1, and the valve J on the gas-well is changed from the position shown at Fig. 1 to that shown at Fig. 5—that is, the partition 12 will rest in water-seat 13 instead of water-seat 14. The gas will now pass through parts $j\,j''$, through flue L, into brick-work $y'$, up through vertical flue 7, and in passage $a'$ comes in contact with the air, which air has passed through opening 8 into flue $n$, into and up through brick-work Z' B'', and meets the gas in passage $a'$, and the flame of combustion thereof passes into chamber E. A part of the flame and heated air passes down and through brick-work B' $y$, through the flue $l$ to the part $j'$, over wall S, down through part $j'''$ of the gas-well, and from thence through flue 11 to the stack S'. Also, a part of the flame passes down and through brick-work K' K into flue $w$, and from thence through flue N to stack S'. The feed-pipes $f$ in the gas-generators $c$ are provided with a drop-valve, P, and when the pipes or cylinders $f$ are filled with coal they are dumped by raising levers 20, and the coal is distributed onto the fire on the grates $g$.

The valve J is constructed of boiler-iron, preferably, and has a partition, 12. The outer edge of the valve rests in a grooved ring, 5, which is filled with water, and the partition 12 rests in either grooved seat 13 or 14. To turn the valve J it is necessary to lift it out of these water-seats by the lever 2, 3, and 4. The valve H, as shown in Fig. 1, closes into pockets $u$ when turned to shut off the gas from chamber X, while changing the currents of air and gas. The valve G at both ends fits into grooved posts or pockets 9, and is turned by means of crank 10.

I claim as new and desire to secure by Letters Patent—

1. In regenerating-furnaces for melting glass, metals, &c., the gas-generators $c$, four-part gas-well $j\,j'$, &c., provided with two-part valve J 12, valve H, conducting-flues $l$ L, four-chambered regenerator 6, air-valve G, flues $n\,w$, and discharge-flues N 11, in combination with a combustion-chamber and receptacle for holding the material to be melted, as and for the purpose specified.

2. The gas-generators $c$, gas-well J $j$, &c., flues L $l$, and air-valve G, and discharge-outlets 11 N, in combination with regenerator 6, composed of checker brick chambers K K' $y$ B, and flue $m$ at one side of the receptacle $m''$, and flue $a'$, checker brick chambers 7 $y'$ B'' Z', and passage $v$ at the opposite side, as and for the purpose specified.

3. The gas-well composed of four compartments, $j\,j'\,j''\,j'''$, provided at its top with a two-part valve, J 12, resting in seats 5 13 14, and provided with lever 2 3 4, in combination with gas-generators $c$, conducting and discharge flues, valves G and H, and regenerator 6, as specified.

WILLIAM F. MODES.

Witnesses:
F. C. BLANDIN,
WM. J. CRANE.